Figure 1:
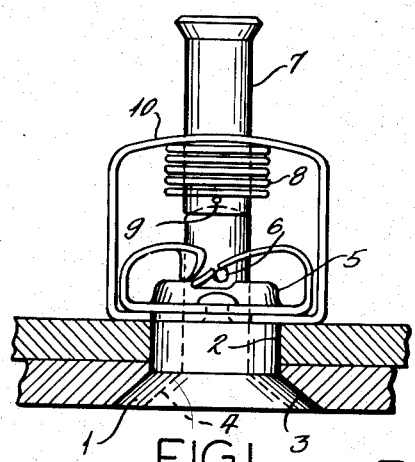

Nov. 30, 1954  C. F. MARSCHNER  2,695,436
RAPID ACTION EJECTOR FASTENING DEVICE FOR CLOSURES
Filed Jan. 30, 1952

INVENTOR:
CHARLES F MARSCHNER
By Gravely, Lieder, Woodruff & Dees
ATTORNEYS.

United States Patent Office 2,695,436
Patented Nov. 30, 1954

2,695,436

RAPID ACTION EJECTOR FASTENING DEVICE FOR CLOSURES

Charles F. Marschner, Normandy, Mo., assignor to McDonnell Aircraft Corporation, St. Louis, Mo., a corporation of Maryland Application January 30, 1952, Serial No. 269,019

2 Claims. (Cl. 24—221)

This device relates to tension and anti-shear type fastening devices and is more particularly directed to a device for ejecting the anti-shear or shear resisting member when the tensioning element has been released.

The object of the invention is to provide an ejector for a fastening device for closures, particularly those for aircraft, wherein the ejector will eject both the shear resistant and the tension resistant part, upon release of the tension part of the fastener.

The invention consists in the provision of a spring member in a closure fastening device engageable with the tension member thereof when assembled into the body of the article having a closure therein that will eject both the shear resistant member and the tension member from the closure.

Figure 2:
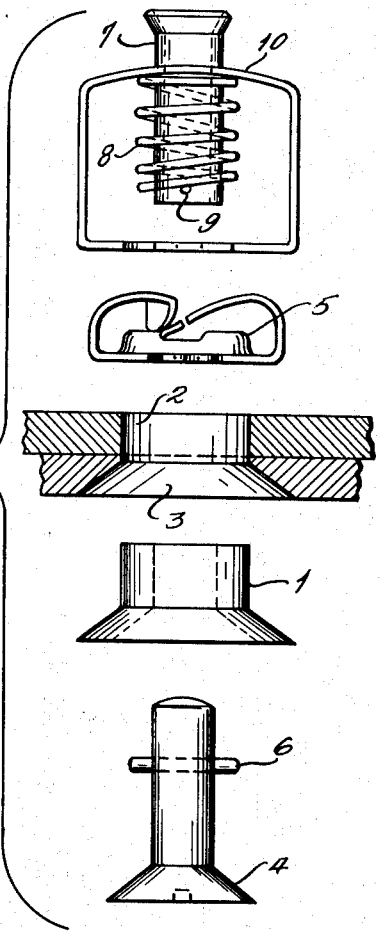
Figure 3:
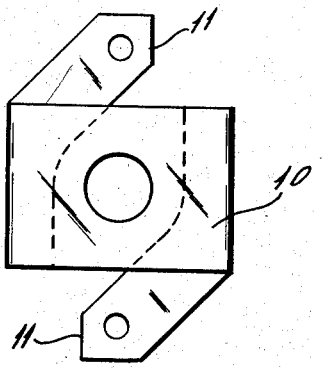
Figure 4:
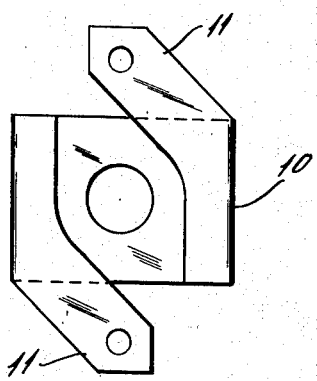

In the drawings:

Fig. 1 is a side elevational view of a fastener and the ejector device attached thereto which embodies the invention, Fig. 2 is an exploded view of the fastener and the ejector device attached thereto; and Figs. 3 and 4 are plan and bottom views, respectively, of the ejector device.

The fastener shown in the several figures of the drawings comprises a shear member 1 inserted in aligned bores 2 and 3, bore 2 being cut in the wall of the closure or member being attached, and bore 3 is cut in the base structure, the exact order not being of importance. The anti-shear or shear resisting member is understood to include those members made to stand up under shear loads, as opposed to a member made to fail in shear at a predetermined load, and the term shear member hereinafter used shall be so taken. The tension member 4 is inserted in the bore of the shear member and extends into the retaining member 5 secured to the plate having bore 2 therein. Member 5 is the receptacle of a standard type fastener which has suitable formations thereon cooperating with a nut or other holding means on the tension member. The closure and base may be movable and stationary elements and the fastener may be carried by either element.

The tension member is provided with a retainer means in the form of a radial pin 6 inserted therein after the tension member has been placed in the shear member 1. The tension member is then lifted upwardly so that the pin passes through slots in the receptacle, whereupon the tension member is rotated so that the pin 6 is engaged by suitable formations thereon. As the tension member 4 is passed upwardly through the retaining member 5 it engages a tube 7 or other suitable guide element to receive and operatively dispose a spring 8. This spring is held in position on the tube or guide element 7 between a pin 9 in the tube and the closed end of a U-shaped bracket element 10, which element is suitably secured to member 5 or to the base structure. The tube 7 extends through one element of the U-shaped member for engagement with the tension member 4 and holds the spring in proper alignment. This tension member will compress spring 8 when the tube is lifted upwardly, as viewed in Fig. 2. Upon release of the tension member 4 from the retaining member 5, spring 8 will eject the shear member and the tension member from bores 2 and 3. The U-shaped member is provided with extensions 11 in alignment with suitable extensions on the retaining member 5. By means of these extensions the same fastening element is employed for securing the U-shaped element and the retaining member to the closure wall.

The shear member 1 is always ejected from the bores by means of spring 8, thereby permitting the closure to be more easily separated from the base structure. Previous constructions provided for ejection of the tension member but no provision was made for ejection of the shear member. This construction permits the operator to detach the closure in a shorter period of time.

The spring 8 has been defined above as abutting a pin 9. This pin may be dispensed with and the end of the spring inserted in the aperture in tube 7 without in any way altering the operation of the fastener.

What I claim is:

1. A fastener for securing a closure to a base structure, each having an aligned bore therein, consisting of a shear member insertable in said bores in snugly fitted relation to take shear forces directly, a tension member in the shear member extending through the closure and the base structure, a retaining member secured to the base structure having diametrically arranged slots therein, pin means on said tension member adapted to pass through the slots of said retaining member and engage the latter to hold said tension and shear members in position, a spring for ejecting the tension and shear members from said bores after said pin means on said tension member has been released from said retaining member, and means for holding said spring in operative alignment on said tension member including a bracket and a guide element movable in said bracket, said spring being carried on said guide element.

2. A fastener for securing a closure to a base structure each having an aligned bore therein, the fastener including a shear member insertable in the aligned bores in snugly fitted relation to take shear forces directly, a tension member in the shear member extending through the base structure, a retaining member secured to the base structure, a pin in the tension member adapted for cooperation with the retaining member to hold said tension and shear members in position, bracket means adjacent said retaining member, a guide element movable in said bracket in alignment with said tension and shear members, and a spring on said guide element normally urging the latter in a direction for ejecting said tension and shear members from said bores after said pin has been released from holding cooperation with said retaining member.

References Cited in the file of this patent

UNITED STATES PATENTS

| Number | Name | Date |
|---|---|---|
| 2,378,122 | Barlow | June 12, 1945 |
| 2,479,992 | Woods | Aug. 23, 1949 |